United States Patent [19]

Takahashi

[11] Patent Number: 4,870,359
[45] Date of Patent: Sep. 26, 1989

[54] METHOD FOR MEASURING THE THICKNESS OF A CERAMIC TUBULAR MOLDED BODY

[75] Inventor: Nobuo Takahashi, Nagoya, Japan

[73] Assignee: NGK Insulators, Ltd., Nagoya, Japan

[21] Appl. No.: 59,618

[22] Filed: Jun. 8, 1987

[30] Foreign Application Priority Data

Jun. 18, 1986 [JP]  Japan .................................. 61-140282

[51] Int. Cl.$^4$ ......................... G01B 7/10; B29C 43/58
[52] U.S. Cl. .................... 324/229; 264/40.1; 324/231; 425/169; 425/174.8 R
[58] Field of Search ................ 324/229–231, 324/222, 557; 264/40.1, 40.2; 425/141, 169, 174.4, 174.8 R

[56] References Cited

U.S. PATENT DOCUMENTS

| | | |
|---|---|---|
| 2,384,529 | 9/1945 | Breitenstein ............... 324/231 X |
| 2,933,677 | 4/1960 | Lieber ............................ 324/230 |
| 3,093,793 | 6/1963 | Hicken ........................... 324/557 |
| 3,430,132 | 2/1969 | Elliott ........................... 324/229 |
| 3,441,840 | 4/1969 | Randle ....................... 324/230 X |
| 3,462,680 | 8/1969 | Kahoun et al. ............... 324/231 |
| 3,710,241 | 1/1973 | Dineen ........................ 425/169 X |
| 3,748,577 | 7/1973 | Jones, Jr. .................. 264/40.2 X |
| 4,053,827 | 10/1977 | Millette et al. ............... 324/230 |
| 4,112,353 | 9/1978 | Thompson .................... 324/557 |
| 4,593,244 | 6/1986 | Summers et al. ............. 324/230 |
| 4,700,486 | 10/1987 | Puumalainen .............. 324/231 X |
| 4,764,724 | 8/1988 | Marugg ........................ 324/230 |

FOREIGN PATENT DOCUMENTS

| | | |
|---|---|---|
| 1009400 | 5/1957 | Fed. Rep. of Germany . |
| 2705624 | 8/1977 | Fed. Rep. of Germany . |
| 0217304 | 1/1985 | Fed. Rep. of Germany ...... 324/229 |
| 0055802 | 5/1981 | Japan .............................. 324/229 |
| 0083004 | 5/1984 | Japan .............................. 324/229 |
| 1410301 | 10/1975 | United Kingdom . |
| 1578441 | 11/1980 | United Kingdom . |

OTHER PUBLICATIONS

"Ceramic Thickness Gage", *Instruments*, vol. 24, Jun. 1951, pp. 692 and 694.

*Primary Examiner*—Gerard R. Strecker
*Attorney, Agent, or Firm*—Arnold, White & Durkee

[57] ABSTRACT

A thickness measurement of non-metallic material molded bodies, particularly, walls of tubular ceramics or plastics, can be simply performed with a high precision, by interposing such a molded body between a metal and a measuring probe, such as a solenoid coil, generating an alternating magnetic field, and measuring an energy loss of the magnetic field which depends on the thickness of the molded body. The energy loss can be measured by detecting a variation of voltage of an A.C. bridge circuit including said coil as a component.

1 Claim, 3 Drawing Sheets

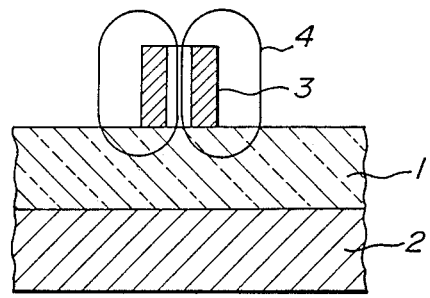
FIG_1
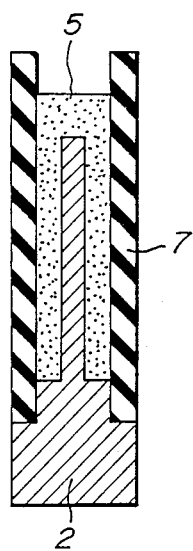
FIG_2A
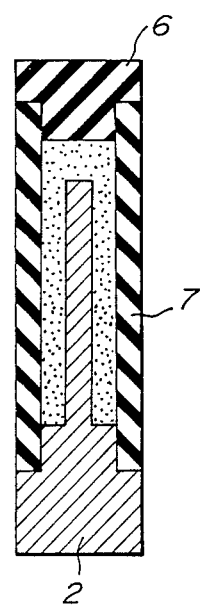
FIG_2B
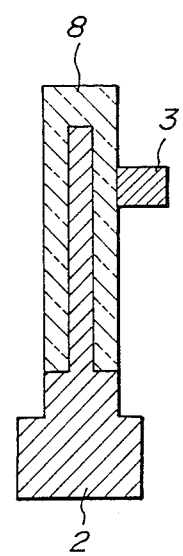
FIG_2C

FIG_3
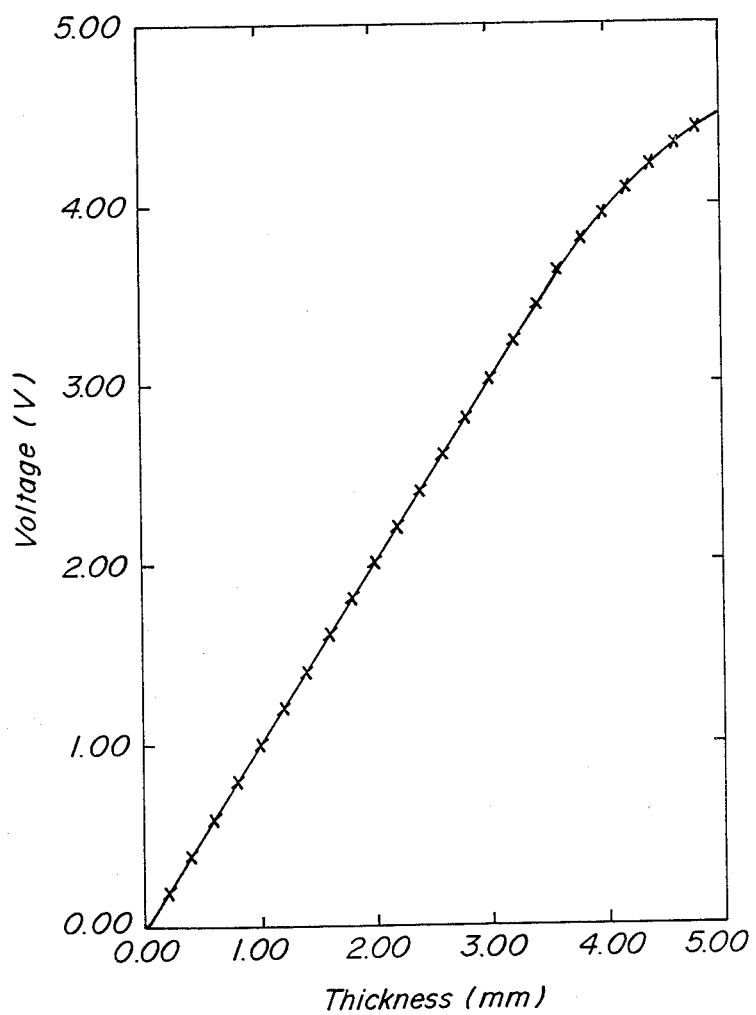

FIG_4
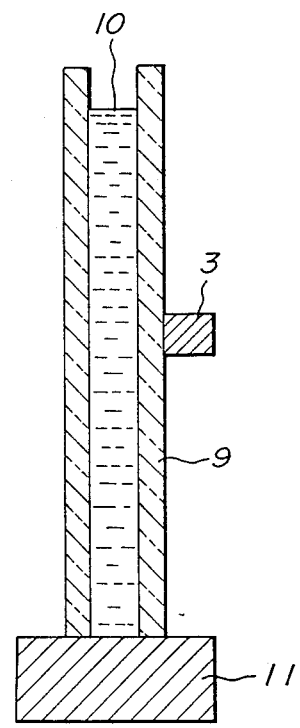

METHOD FOR MEASURING THE THICKNESS OF A CERAMIC TUBULAR MOLDED BODY

BACKGROUND OF THE INVENTION

1. Field of the Invention

This invention relates to a measurement of a dimension of non-metallic material molded bodies having a shape that is impossible to measure by a usual means, such as vernier calipers, micrometer calipers and the like.

2. Description of the Prior Art

As means of measurement of a dimension, particularly a thickness, of a body, vernier calipers and micrometer calipers have been most usually and extensively used. However, as is easily understood from the general shape of the vernier calipers or micrometer calipers, when a body to be measured has a form such that the body cannot be interposed between the calipers, the measurement of the thickness is, as a matter of course, impossible. Namely, what cannot be measured with calipers are, for example, a wall thickness of a middle portion of a slender hollow tube, a wall thickness of a closed tip portion of a cul-de-sac i.e. a hollow tube with a closed end, etc., as into these tubes, measuring parts of the vernier calipers or micrometer calipers cannot be inserted.

Incidentally, amongst non-metallic material molded bodies, ceramic products are generally manufactured by granulating a starting powder added with a bonding agent such as a binder or the like, forming the thus granulated powder into a ceramic green molded body, by a molding means such as mold pressing, isostatic pressing or the like, and thereafter firing the ceramic green molded body at a predetermined temperature in an electric furnace, etc. The dimension of the products is influenced by conditions of firing which is accompanied by contraction, and the conditions of firing are usually constant, so that the dimension of the products depends upon that of the ceramic green molded bodies in the molding process. Accordingly, precise measurement and control of the dimension of the ceramic green molded bodies are very important, in the ceramics manufacture, for lessening dispersion of dimension of the products after firing.

Thus, the ceramic molded body before firing is particularly pertinent to the present invention and herein called a ceramic green molded body, though the ceramic product after firing also can be understood to be a kind of a non-metallic material molded body to which the invention is applied.

As means of thickness measurement of the ceramic green molded bodies, a direct method as mentioned above has been generally employed, wherein a measuring implement, such as vernier calipers, micrometer calipers and the like, is used. However, as was mentioned hereinabove, when a ceramic green molded body to be measured is in a form of a hollow tube or a cul-de-sac, i.e., a hollow tube with a closed end, it has been almost impossible to make a measure of the wall thickness of the middle portion or near the closed end portion, due to the inadequate shape of the vernier calipers or micrometer calipers. Further, since ceramic green molded bodies are generally brittle and fragile wherein particles of the material powder are merely bound together by the action of a binder, hollow tubular such bodies with a thin wall have frequently suffered impairment, such as cracks, etc., during the thickness measurement.

Furthermore, like a transparent alumina ceramic blow-molded part which is used as a light-emitting tube in a high pressure sodium-vapor lamp, etc., when the hollow tube is in a bulbed form, with a middle portion having a diameter (about 5 mm) larger than that of its end portion (about 3 mm), the vernier calipers cannot be inserted thereinto, so that the measurement of the wall thickness of the middle portion (about 0.2 mm) has been absolutely impossible. Besides, it is very important for ceramic products having such a form, in view of their use, to have a small dispersion of wall thickness, particularly, at the middle portion thereof.

On the other hand, although there has been an indirect method for measuring the thickness by making use of ultrasonic, yet attenuation of the ultrasonic wave is generally so rapid due to the fragility and softness, as mentioned above, of the ceramic green molded bodies immediately after molding, that the thickness measurement with a high precision has been difficult.

SUMMARY OF THE INVENTION

An object of the present invention is to provide a measuring method of a dimension whereby a measure can be simply made of a thickness of a non-metallic material molded body having a shape such that the measurement has been difficult by a conventional means such as vernier calipers, micrometer calipers or the like. Namely, the method of the present invention having the above object, can determine with a high precision, particularly in a molding step of ceramics, the thickness of a portion of a ceramic green molded body which has been difficult to measure by a conventional means. In the method of the present invention, use is made of, for example, an electric conductive, metallic mold which is substantially in close contact with the ceramic green molded body immediately after molding.

A method for measuring a dimension of a non-metallic material molded body in accordance with the present invention, is characterized by interposing the non-metallic material molded body between a metal and a measuring probe generating an alternating magnetic field, and measuring an energy loss of the alternating magnetic field which depends on a thickness of the non-metallic material molded body.

BRIEF DESCRIPTION OF THE DRAWINGS

The invention is illustrated diagrammatically in the following drawings wherein:

FIG. 1 is a sectional view illustrating schematically the thickness measurement, according to the present invention, of a ceramic green molded body;

FIGS. 2A 2B and 2C are sectional views, illustrating an embodiment of the present invention;

FIG. 3 is a graph showing a relation between a thickness of a molded body and a displayed voltage of a bridge circuit, in the embodiment shown in FIG. 2; and FIG. 4 is a sectional view showing another embodiment of the present invention.

DETAILED DESCRIPTION OF THE INVENTION

The present invention defined above is effective for measuring thicknesses of a body consisting of a non-metallic material and having a hollow shape, etc. To a body consisting of a metallic material, this invention is theoretically not applicable from the reason that will be explained hereinafter. As the non-metallic material, mention may be made of organic materials such as plastics, etc. and inorganic materials such as ceramics, etc. Further, by a body consisting of a non-metallic material is often meant a molded body, generally the material of which has been processed by a certain means, irrespective or an intermediate product in manufacturing steps or a final product.

The principle applied to the present invention will be explained hereinafter. It is widely known that, when a good conductor, such as a metal, etc., exists in an alternating magnetic field, an eddy current corresponding to the alternating magnetic field is finally induced in the conductor. At this time, a part of energy of the alternating magnetic field is finally converted, in the good conductor, into thermal energy which is eventually lost. In general, an extent of the loss depends on a frequency of the alternating magnetic field, an intensity of the magnetic field and an electric conductivity of the good conductor.

In contrast, in the case of an electric insulator which never disturbs the alternating magnetic field, the loss is substantially negligible. Most of non-metallic materials, such as plastics, ceramics and the like, are electrically insulative. Since usual ceramic green molded bodies are also electrically insulative, they cause no losses. Further, even when the ceramic green molded bodies are semi-conductive, they can be relatively regarded as electric insulators, because their resistivity near room temperature is $1 \times 10^0 \sim 1 \times 10^1$ $\Omega$·cm or more which is larger by $6 \sim 7$ figures or more, as compared with metals, i.e., good conductors, generally having a resistivity of the order of $1 \times 10^{-6}$ $\Omega$·cm.

In the present invention, the above principle is applied as follows. In a molding step of usual ceramics, as shown in FIG. 1, a measuring probe 3 generating an alternating magnetic field 4 is brought into contact with a ceramic green molded body 1 which is substantially in close contact with a metallic mold 2 immediately after molding. Since materials of the metallic mold 2 and ceramic green molded body 1 are usually kept unchanged and, besides, intensity and frequency of the alternating magnetic field 4 generated by the probe 3 can be kept constant, a loss of the alternating magnetic field 4 depends on the distance between the probe 3 can be kept constant, a loss of he alternating magnetic field 4 depends on the distance between the probe 3 and the metallic mold 2, i.e., the thickness of the ceramic green molded body 1. The thicker the green molded body 1 is, the less the loss is, and the thinner, the larger the loss is. Though this relation between the loss and the thickness is generally non-linear, if the relation has been found in advance, the thickness can be obtained from the loss amount.

The probe 3 that generates the alternating magnetic field is basically composed of a so-called solenoid coil. The solenoid coil may have a magnetic core. In order to attain a close electromagnetic combination of the alternating magnetic field 4 with the metallic mold 2, it is desired, from the principle, that the central axis of symmetry of the coil is in the perpendicular direction to a surface of the metallic mold 2. If the relation between the loss and he thickness has been found in advance, the surface of the metallic mold 2 may not necessarily be planar, and may be a curved surface. However, in order to attain a close electromagnetic combination, it is important that the ceramic green molded body 1 is not too thick for the diameter of the solenoid coil. Generally, a thickness approximately not larger than the diameter of the coil is preferably measured.

Though the above explanation was made about ceramic green molded bodies, the principle in the present invention, as it utilizes a condition wherein a metal is in close contact with one side of a non-metallic material molded body to be measured of the thickness, is theoretically applicable to any non-metallic material molded bodies, such as ceramic fired bodies or organic material molded bodies such as plastics, etc., if a metal, for example, a liquid metal such as mercury, is in close contact therewith.

A measure of the loss of the alternating magnetic field, i.e., the loss caused in the coil, is generally made by composing an A.C. bridge circuit including the coil as a component thereof. In the A.C. bridge circuit, the loss, i.e., a variation of impedance of the coil is relatively easily detectable, as a variation of voltage, by modifying a known electronic circuit. The frequency of the alternating magnetic field, i.e., a frequency of the bridge, is preferably 1 KHz $\sim$ 100 KHz and, more preferably 10 KHz $\sim$ 30 KHz. The reason why the frequency preferably ranges between 1 KHz and 100 KHz, is because, if less than 1 KHz, the variation of impedance is so small that a measurement error increases and, if more than 100 KHz, the measurement error also increases due to a stray capacity of the A.C. bridge circuit. The reason why the range from 10 KHz to 30 KHz is more preferred, is because each of the error factors described above decreases in this range.

The present invention will be further explained by way of examples.

EXAMPLE 1

The present invention was applied to a thickness measurement of a cul-de-sac like zirconia green molded body, that is, a hollow tube having a closed end, in a molding step of a zirconia ceramic. This zirconia green molded body is fired and employed as a solid electrolyte oxygen sensor of an oxygen densitometer. For the solid electrolyte wherein ions move to the direction of the thickness, a control of the thickness is particularly important.

As shown in FIG. 2A, a rubber shell 7 of a cylindrical form was fixed on a stainless steel rod-like metallic mold 2 having a portion or a granulated powder to contact therewith, of 15 mm diameter and 385 mm length, and a space between the rubber shell 7 and the metallic mold 2 was filled with zirconia granulated powder 5. Then, as shown in FIG. 2B, a rubber cap 6 was fixed, upper and lower joint parts of the rubber shell 7 were sealed with a vinyl tape, etc. wound thereon, to prevent infiltration of power water, and molding was carried out with a pressure of 2,000 kg/cm$^2$, in an isostatic pressing machine. Next, as shown in FIG. 2C, the rubber cap 6 and the rubber shell 7 were removed and a measuring probe 3 of 5 mm in diameter was contacted with a side surface of an exposed zirconia green molded body 8. A displayed voltage of a bridge circuit electrically connected with the measuring probe 3, was read. Thereafter, the zirconia green molded body 8 was broken down, and the thickness of the portion that the probe was contacted with, was measured with micrometer calipers. The above procedure was repeated 25 times to find a relation between the thickness of the zirconia green molded body 8 and the displayed voltage of the bridge circuit. Thus, as shown in FIG. 3, a good linear relation was obtained in the range from 0 mm to 3 mm. The bridge circuit used in this example was added with a non-linearity correction circuit, and the frequency was 20 KHz. The thickness of the zirconia green molded body 8 may be usually controlled to be 2 mm ±0.1 mm and, according to this embodiment, the measurement had a sufficient precision and was practical.

EXAMPLE 2

The present invention was applied to a thickness measurement of a hollow tubular alumina ceramic fired body.

As shown in FIG. 4, a hollow alumina ceramic fired body 9 having 20 mm outside diameter, 15 mm inside diameter and 200 mm length, was stood perpendicularly on a base 11 and, from the upper opening end, a liquid metal i.e. mercury 10, was poured into the hollow. A measuring probe 3 having 5 mm diameter was contacted with a middle portion of the outer surface of the alumina ceramic fired body 9, and a displayed voltage of a bridge circuit was read. Then, the alumina ceramic fired body 9 was broken down, and the thickness of the portion that the probe was contacted with, was measured with micrometer calipers. A relation between the thickness of the fired body and the displayed voltage of the bridge circuit, accorded with the straight line shown in FIG. 3 and was practical.

EXAMPLE 3

The thickness measurement same as described in Example 2 was applied to a ceramic green molded body of a cul-de-sac form or a $\beta$-alumina solid electrolyte, and also to a ceramic green molded body for a hollow tubular alumina porous ceramic filter for liquid or gas filtration. Then, results similar to that shown in FIG. 3 were obtained.

As the above, by using the method for measuring a non-metallic material molded body according to the present invention, measurement and determination of thicknesses, with simplicity and a high precision, can be effected in a middle portion of a hollow tube or a closed end portion of a cul-de-sac, of a ceramic green molded body, without giving impairment to the ceramic green molded body, the wall thickness of which has so far been almost impossible to measure.

What is claimed is:

1. A method of measuring the thickness of a ceramic tubular molded body having a closed end, comprising:
    contacting a measuring probe with the outside surface of the ceramic tubular molded body immediately after molding, which ceramic tubular molded body temporarily supports inside thereof a metallic mold used in the molding; and
    measuring the thickness of said ceramic body immediately after molding utilizing an electromagnetic combination of an alternating magnetic field generated by said probe with said metallic mold, said alternating magnetic field having a frequency ranging from 1 KHz to 100 KHz.

* * * * *